United States Patent
Cheng et al.

(10) Patent No.: US 12,028,959 B2
(45) Date of Patent: *Jul. 2, 2024

(54) EUV LIGHT SOURCE AND APPARATUS FOR EUV LITHOGRAPHY

(71) Applicant: TAIWAN SEMICONDUCTOR MANUFACTURING COMPANY, LTD., Hsinchu (TW)

(72) Inventors: Wei-Shin Cheng, Hsinchu (TW); Han-Lung Chang, Kaohsiung (TW); Li-Jui Chen, Hsinchu (TW); Po-Chung Cheng, Longxing Village (TW); Hsiao-Lun Chang, Tainan (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 42 days.

This patent is subject to a terminal disclaimer.

(21) Appl. No.: 17/875,288

(22) Filed: Jul. 27, 2022

(65) Prior Publication Data

US 2022/0369447 A1    Nov. 17, 2022

Related U.S. Application Data

(63) Continuation of application No. 17/135,768, filed on Dec. 28, 2020, now Pat. No. 11,470,710, which is a continuation of application No. 16/426,489, filed on May 30, 2019, now Pat. No. 10,880,980.

(60) Provisional application No. 62/738,364, filed on Sep. 28, 2018.

(51) Int. Cl.
*H05G 2/00*    (2006.01)
*G05D 7/06*    (2006.01)

(52) U.S. Cl.
CPC ........... *H05G 2/005* (2013.01); *G05D 7/0635* (2013.01); *H05G 2/006* (2013.01)

(58) Field of Classification Search
CPC ....... H05G 2/005; H05G 2/006; G05D 7/0635
See application file for complete search history.

(56) References Cited

U.S. PATENT DOCUMENTS

| | | |
|---|---|---|
| 7,122,816 B2 | 10/2006 | Algots et al. |
| 8,796,666 B1 | 8/2014 | Huang et al. |
| 9,093,530 B2 | 7/2015 | Huang et al. |
| 9,184,054 B1 | 11/2015 | Huang et al. |
| 9,256,123 B2 | 2/2016 | Shih et al. |
| 9,529,268 B2 | 12/2016 | Chang et al. |

(Continued)

OTHER PUBLICATIONS

Non-final Office Action issued in U.S. Appl. No. 16/426,489, dated Jul. 24, 2020.

(Continued)

*Primary Examiner* — Nicole M Ippolito
*Assistant Examiner* — Hanway Chang
(74) *Attorney, Agent, or Firm* — STUDEBAKER & BRACKETT PC

(57) ABSTRACT

A metal reuse system for an extreme ultra violet (EUV) radiation source apparatus includes a first metal collector for collecting metal from vanes of the EUV radiation source apparatus, a first metal storage coupled to the first metal collector via a first conduit, a metal droplet generator coupled to the first metal storage via a second conduit, and a first metal filtration device disposed on either one of the first conduit and the second conduit.

20 Claims, 10 Drawing Sheets

(56) References Cited

U.S. PATENT DOCUMENTS

| | | |
|---|---|---|
| 9,548,303 B2 | 1/2017 | Lee et al. |
| 9,618,837 B2 | 4/2017 | Lu et al. |
| 9,869,928 B2 | 1/2018 | Huang et al. |
| 9,869,934 B2 | 1/2018 | Huang et al. |
| 9,869,939 B2 | 1/2018 | Yu et al. |
| 10,880,980 B2 | 12/2020 | Cheng et al. |
| 11,470,710 B2 * | 10/2022 | Cheng .................... H05G 2/006 |
| 2014/0326904 A1 | 11/2014 | Ceglio et al. |

OTHER PUBLICATIONS

Notice of Allowance issued in U.S. Appl. No. 16/426,489, dated Oct. 29, 2020.
Non-Final Office Action issued in U.S. Appl. No. 17/135,768, dated Jan. 19, 2022.
Notice of Allowance issued in U.S. Appl. No. 17/135,768, dated May 24, 2022.

* cited by examiner

EUV LIGHT SOURCE AND APPARATUS FOR EUV LITHOGRAPHY

RELATED APPLICATION

This application is a continuation of U.S. application Ser. No. 17/135,768 filed Dec. 28, 2020, which is a continuation of U.S. application Ser. No. 16/426,489 filed on May 30, 2019, now U.S. Pat. No. 10,880,980, which claims priority to U.S. Provisional Patent Application No. 62/738,364 filed on Sep. 28, 2018, the entire contents of which are incorporated herein by reference.

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs.

For example, the need to perform higher resolution lithography processes grows. One lithography technique is extreme ultraviolet lithography (EUVL). The EUVL employs scanners using light in the extreme ultraviolet (EUV) region, having a wavelength of about 1-100 nm. Some EUV scanners provide reduction projection printing, similar to some optical scanners, except that the EUV scanners use reflective rather than refractive optics, i.e., mirrors instead of lenses. One type of EUV light source is laser-produced plasma (LPP). LPP technology produces EUV light by focusing a high-power laser beam onto small tin droplet targets to form highly ionized plasma that emits EUV radiation with a peak maximum emission at 13.5 nm. The EUV light is then collected by a LPP collector and reflected by optics towards a lithography target, e.g., a wafer. The LPP collector is subjected to damage and degradation due to the impact of particles, ions, radiation, and most seriously, tin deposition.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
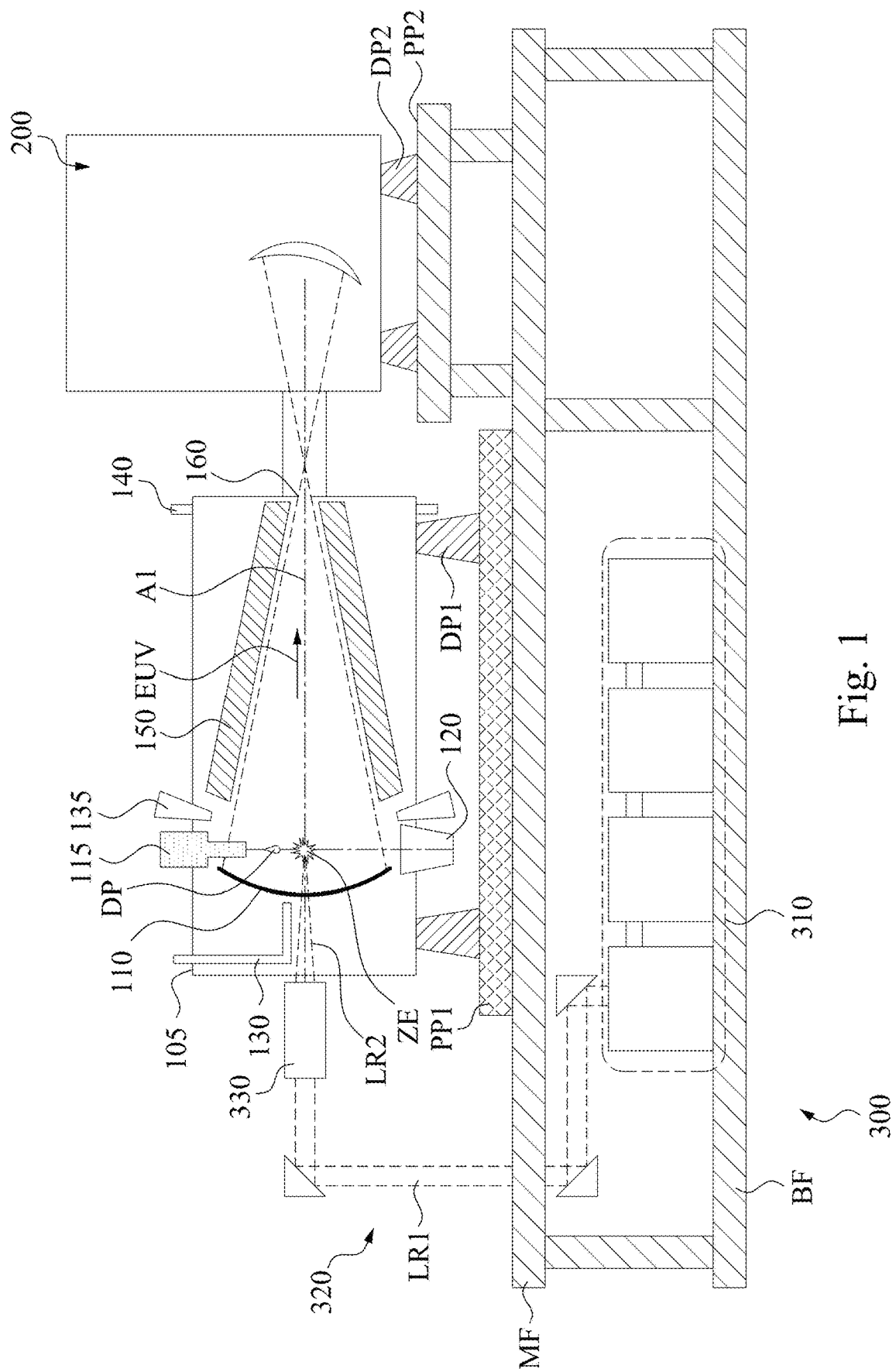
FIG. 1 is a schematic view of an EUV lithography system with a laser produced plasma (LPP) EUV radiation source, constructed in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus/device may be otherwise oriented (rotated 90 degrees or at other orientations) and the spatially relative descriptors used herein may likewise be interpreted accordingly. In addition, the term "made of" may mean either "comprising" or "consisting of."

The present disclosure is generally related to extreme ultraviolet (EUV) lithography system and methods. More particularly, it is related to apparatuses and methods for mitigating contamination on a collector in a laser produced plasma (LPP) EUV radiation source. The collector, also referred to as an LPP collector or an EUV collector or a collector mirror, is an important component of the LPP EUV radiation source. It collects and reflects EUV radiation and contributes to overall EUV conversion efficiency. However, it is subjected to damage and degradation due to the impact of particles, ions, radiation, and debris deposition. In particular, tin (Sn) debris is one of the contamination sources to the EUV collector. Objectives of the present disclosure may include to reduce a frequency to swap a heated tin vane bucket (HTVB); to reduce a frequency to service (e.g., clearing) a tin catcher; and by recycling tin collected in the HTVB and the tin catcher and feeding it to the droplet generator, to reduce a frequency to refill the droplet generator with tin.

Figure 3:
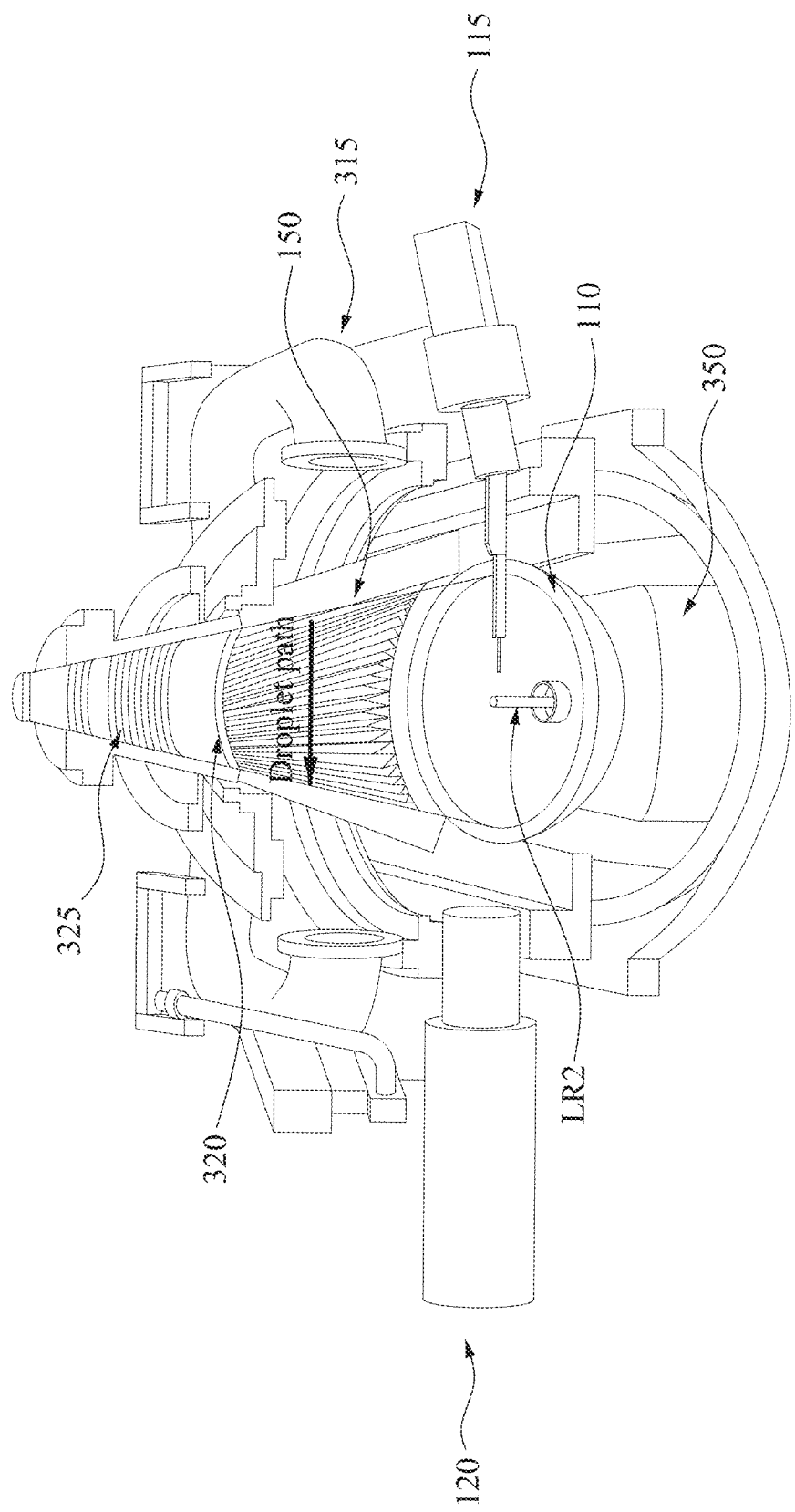
FIG. 3 shows a schematic view of an EUV vessel.

FIG. 1 is a schematic and diagrammatic view of an EUV lithography system. FIG. 3 shows a schematic view of an EUV vessel. As shown in FIG. 1, the EUV lithography system includes an EUV radiation source apparatus 100 to generate EUV light, an exposure tool 200, such as a scanner, and an excitation laser source apparatus 300. As shown in FIG. 1, in some embodiments, the EUV radiation source apparatus 100 and the exposure tool 200 are installed on a main floor MF of a clean room, while the excitation source apparatus 300 is installed in a base floor BF located under the main floor. Each of the EUV radiation source apparatus 100 and the exposure tool 200 are placed over pedestal plates PP1 and PP2 via dampers DP1 and DP2, respectively. The EUV radiation source apparatus 100 and the exposure tool 200 are coupled to each other by a coupling mechanism, which may include a focusing unit.

The lithography system is an extreme ultraviolet (EUV) lithography system designed to expose a resist layer by EUV light (or EUV radiation). The resist layer is a material sensitive to the EUV light. The EUV lithography system employs the EUV radiation source apparatus 100 to generate EUV light, such as EUV light having a wavelength ranging between about 1 nm and about 100 nm. In one particular example, the EUV radiation source 100 generates an EUV light with a wavelength centered at about 13.5 nm. In the present embodiment, the EUV radiation source 100 utilizes a mechanism of laser-produced plasma (LPP) to generate the EUV radiation.

The exposure tool 200 includes various reflective optic components, such as convex/concave/flat mirrors, a mask holding mechanism including a mask stage, and wafer holding mechanism. The EUV radiation EUV generated by the EUV radiation source 100 is guided by the reflective optical components onto a mask secured on the mask stage. In some embodiments, the mask stage includes an electrostatic chuck (e-chuck) to secure the mask. Because gas molecules absorb EUV light, the lithography system for the EUV lithography patterning is maintained in a vacuum or a-low pressure environment to avoid EUV intensity loss.

In the present disclosure, the terms mask, photomask, and reticle are used interchangeably. In the present embodiment, the mask is a reflective mask. One exemplary structure of the mask includes a substrate with a suitable material, such as a low thermal expansion material or fused quartz. In various examples, the material includes $TiO_2$ doped $SiO_2$, or other suitable materials with low thermal expansion. The mask includes multiple reflective multiple layers (ML) deposited on the substrate. The ML includes a plurality of film pairs, such as molybdenum-silicon (Mo/Si) film pairs (e.g., a layer of molybdenum above or below a layer of silicon in each film pair). Alternatively, the ML may include molybdenum-beryllium (Mo/Be) film pairs, or other suitable materials that are configurable to highly reflect the EUV light. The mask may further include a capping layer, such as ruthenium (Ru), disposed on the ML for protection. The mask further includes an absorption layer, such as a tantalum boron nitride (TaBN) layer, deposited over the ML. The absorption layer is patterned to define a layer of an integrated circuit (IC). Alternatively, another reflective layer may be deposited over the ML and is patterned to define a layer of an integrated circuit, thereby forming an EUV phase shift mask.

The exposure tool 200 includes a projection optics module for imaging the pattern of the mask on to a semiconductor substrate with a resist coated thereon secured on a substrate stage of the exposure tool 200. The projection optics module generally includes reflective optics. The EUV radiation (EUV light) directed from the mask, carrying the image of the pattern defined on the mask, is collected by the projection optics module, thereby forming an image onto the resist.

In the present embodiments, the semiconductor substrate is a semiconductor wafer, such as a silicon wafer or other type of wafer to be patterned. The semiconductor substrate is coated with a resist layer sensitive to the EUV light in the present embodiment. Various components including those described above are integrated together and are operable to perform lithography exposing processes.

The lithography system may further include other modules or be integrated with (or be coupled with) other modules.

As shown in FIG. 1, the EUV radiation source 100 includes a target droplet generator 115 and a LPP collector 110, enclosed by a chamber 105. The target droplet generator 115 generates a plurality of target droplets DP. In some embodiments, the target droplets DP are tin (Sn) droplets. Other metals, such as Li, can be used. In some embodiments, Sn is doped with Ga and/or In. In some embodiments, the tin droplets each have a diameter about 30 microns (μm). In some embodiments, the tin droplets DP are generated at a rate about 50 droplets per second and are introduced into a zone of excitation (ZE) at a speed between about 70 to about 120 meters per second (m/s). Other material can also be used for the target droplets, for example, a tin containing liquid material such as an eutectic alloy containing tin or lithium (Li).

The excitation laser LR2 generated by the excitation laser source apparatus 300 is a pulse laser. In some embodiments, the excitation layer includes a pre-heat laser and a main laser. The pre-heat laser pulse is used to heat (or pre-heat) the target droplet to create a low-density target plume, which is subsequently heated (or reheated) by the main laser pulse, generating increased emission of EUV light.

In various embodiments, the pre-heat laser pulses have a spot size about 100 μm or less, and the main laser pulses have a spot size about 200-300 μm.

The laser pulses LR2 are generated by the excitation laser source 300. The laser source 300 may include a laser generator 310, laser guide optics 320 and a focusing apparatus 330. In some embodiments, the laser source 310 includes a carbon dioxide ($CO_2$) or a neodymium-doped yttrium aluminum garnet (Nd:YAG) laser source. The laser light LR1 generated by the laser generator 300 is guided by the laser guide optics 320 and focused into the excitation laser LR2 by the focusing apparatus 330, and then introduced into the EUV radiation source 100.

The laser light LR2 is directed through windows (or lenses) into the zone of excitation ZE. The windows adopt a suitable material substantially transparent to the laser beams. The generation of the pulse lasers is synchronized with the generation of the target droplets. As the target droplets move through the excitation zone, the pre-pulses heat the target droplets and transform them into low-density target plumes. A delay between the pre-pulse and the main pulse is controlled to allow the target plume to form and to expand to an optimal size and geometry. When the main pulse heats the target plume, a high-temperature plasma is generated. The plasma emits EUV radiation EUV, which is collected by the collector mirror 110. The collector 110 further reflects and focuses the EUV radiation for the lithography exposing processes. A tin droplet catcher 120 is installed opposite the target droplet generator 115. The tin droplet catcher 120 is used for catching excessive target droplets. For example, some target droplets may be purposely missed by the laser pulses. In some embodiments, the tin droplet catcher 120 is heated at a temperature higher than the melting point of tin, e.g., about 250° C. to about 300° C.

The collector 110 is designed with a proper coating material and shape to function as a mirror for EUV collection, reflection, and focusing. In some embodiments, the collector 110 is designed to have an ellipsoidal geometry. In some embodiments, the coating material of the collector 100 is similar to the reflective multilayer of the EUV mask. In some examples, the coating material of the collector 110 includes a ML (such as a plurality of Mo/Si film pairs) and may further include a capping layer (such as Ru) coated on the ML to substantially reflect the EUV light. In some embodiments, the collector 110 may further include a grating structure designed to effectively scatter the laser beam directed onto the collector 110. For example, a silicon nitride layer is coated on the collector 110 and is patterned to have a grating pattern.

FIG. 3 shows an EUV vessel. In addition to the target droplet generator 115, collector 110 and a tin droplet catcher 120, root line 315, a scrubber 320, a lower cone 325 and a heated tin vane bucket (HTVB) 350 (e.g., a first metal collector) are shown.

In such an EUV radiation source apparatus, the plasma caused by the laser application creates physical debris, such as ions, gases and atoms of the droplet, as well as the desired EUV radiation. It is necessary to prevent the accumulation of material on the collector 110 and also to prevent physical debris exiting the chamber 105 and entering the exposure tool 200.

As shown in FIG. 1, in the present embodiments, a buffer gas is supplied from a first buffer gas supply 130 through the aperture in collector 110 by which the pulse laser is delivered to the tin droplets. In some embodiments, the buffer gas is $H_2$, He, Ar, $N_2$ or another inert gas. In certain embodiments, $H_2$ is used as H radicals generated by ionization of the buffer gas can be used for cleaning purposes. The buffer gas can also be provided through one or more second buffer gas supplies 135 toward the collector 110 and/or around the edges of the collector 110. Further, the chamber 105 includes one or more gas outlets 140 so that the buffer gas is exhausted outside the chamber 105.

Hydrogen gas has low absorption to the EUV radiation. Hydrogen gas reaching to the coating surface of the collector 110 reacts chemically with a metal of the droplet forming a hydride, e.g., metal hydride. When tin (Sn) is used as the droplet, stannane ($SnH_4$), which is a gaseous byproduct of the EUV generation process, is formed. The gaseous $SnH_4$ is then pumped out through the outlet 140. However, it is difficult to exhaust all gaseous $SnH_4$ from the chamber and to prevent the $SnH_4$ from entering the exposure tool 200.

Figure 2B:
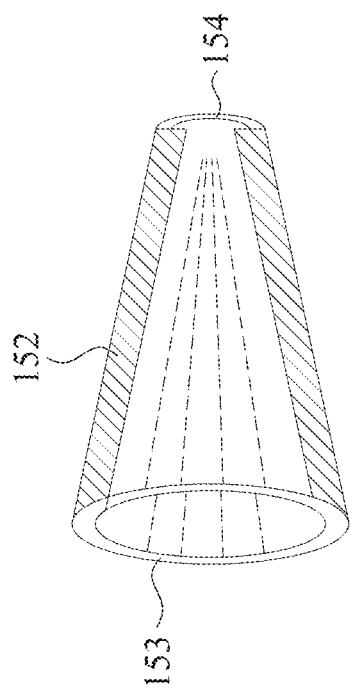
FIG. 2B is a schematic side view of a debris collection mechanism used in the EUV radiation source according to some embodiments of the present disclosure.
Figure 2C:
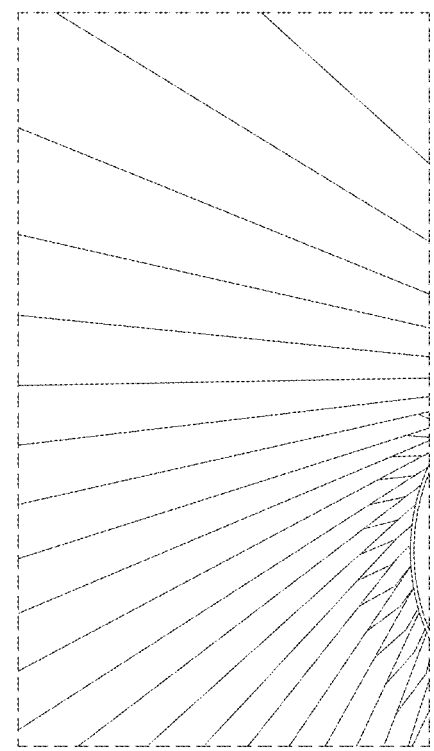
FIG. 2C is a partial picture of a vane used in the EUV radiation source according to some embodiments of the present disclosure.
Figure 2A:
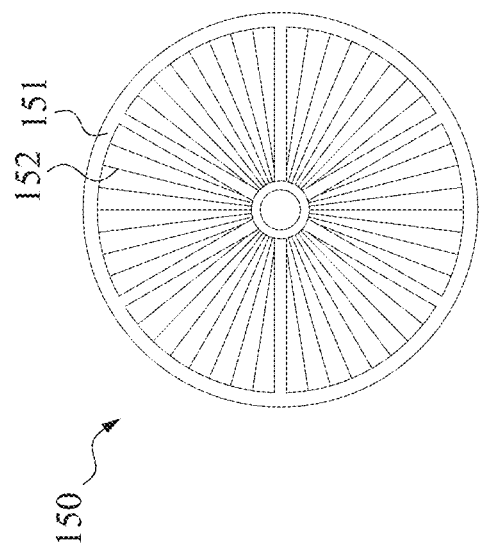
FIG. 2A is a schematic front view of a debris collection mechanism used in the EUV radiation source according to some embodiments of the present disclosure.

To trap the $SnH_4$ or other debris, one or more debris collection mechanisms 150 are employed in the chamber 105. As shown in FIG. 1, one or more debris collection mechanisms 150 are disposed along optical axis A1 between the zone of excitation ZE and an output port 160 of the EUV radiation source 100. FIG. 2A is a front view of the debris collection mechanism 150 and FIG. 2B is a schematic side view of debris collection mechanism 150. FIG. 2C is a partial picture of the debris collection mechanism 150. The debris collection mechanism 150 includes a frustoconical support frame 151, a first end support 153 and a second end support 154 that operably support a plurality of vanes 152 that rotate within the housings. The first end support 153 has a larger diameter than the second end support 154. The debris collection mechanism 150 serves to prevent the surface of collector 110 and/or other elements/portions of the inside the chamber 105 from being coated by Sn vapor by sweeping out slow Sn atoms and/or $SnH_4$ via rotating vanes 152.

The plurality of vanes 152 project radially inwardly from the frustoconical support frame 151. The vanes 152 are thin and elongate plates. In some embodiments, each of the vanes has a triangular or trapezoid or trapezium shape in plan view. The vanes 152 are aligned so that their longitudinal axes are parallel to the optical axis A1 so that they present the smallest possible cross-sectional area to the EUV radiation EUV. The vanes 152 project towards the optical axis A1, but do not extend as far as the optical axis. In some embodiments, a central core of the debris collection mechanism 150 is empty. The debris collection mechanism 150 is driven to rotate by a drive unit including one or more motors, one or more belts and/or one or more gears, or any rotating mechanism. The vanes 152 are heated at 100° C. to 400° C. by a heater in some embodiments.

As set forth above, tin vapor or tin debris is collected by the vanes 152. As shown in FIG. 3, the EUV vessel is heated by a heater disposed around the vessel to melt the collected tin and molten tin would follow the wall of vessel, and finally go to a heated tin vane bucket (HTVB) 350.

According to embodiments of the present disclosure, tin collected by a tin droplet catcher 120 (e.g., a second metal collector) and/or a heated tin vane bucket 350 is reused to generate tin droplet by the target droplet generator 115.

Figure 4:
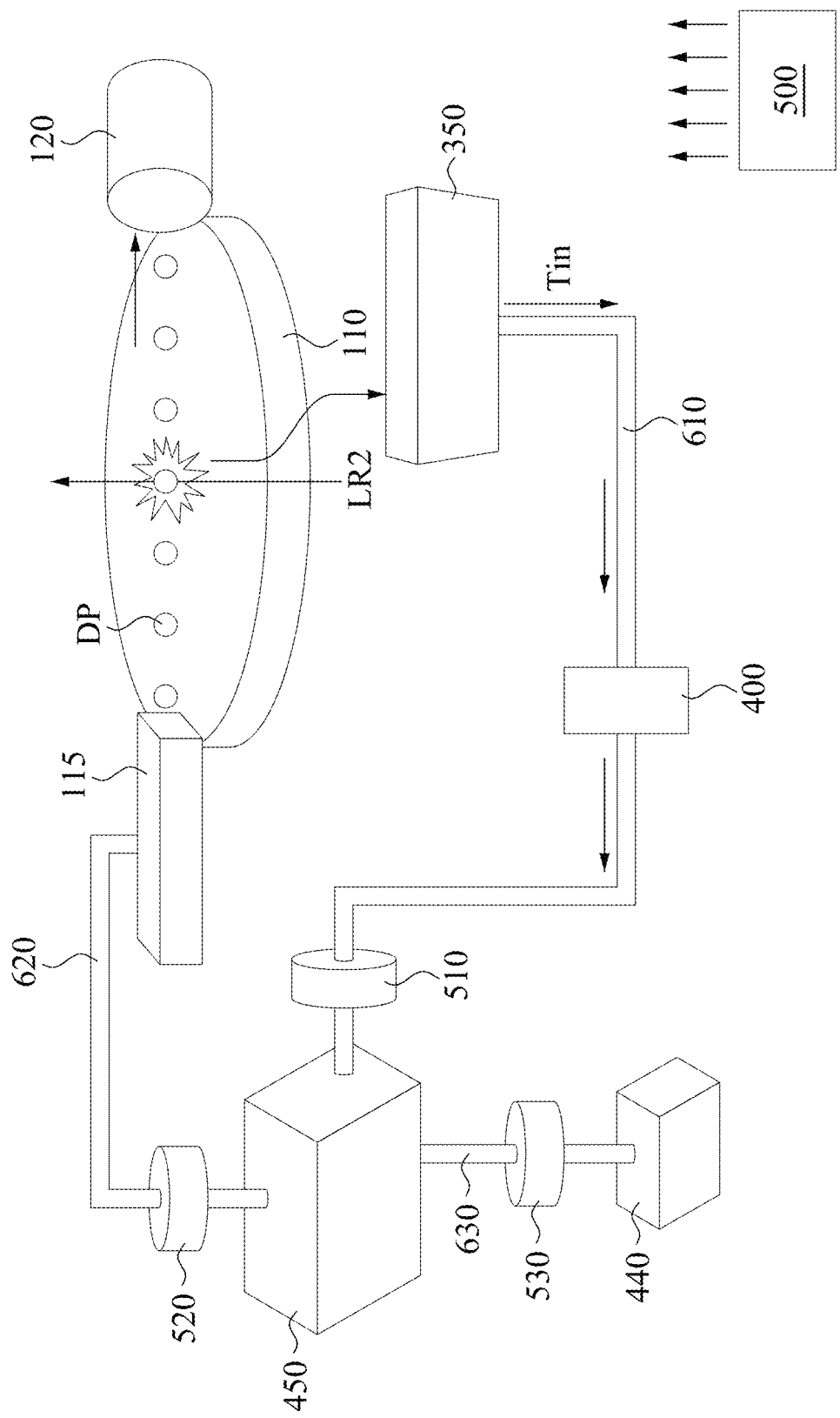
FIG. 4 shows a configuration of a tin reuse system for an EUV radiation source according to an embodiment of the present disclosure.

FIG. 4 shows a configuration of a tin reuse system for an EUV radiation source according to an embodiment of the present disclosure. In this embodiment, collected tin by the heated tin vane bucket 350 is reused.

As shown in FIG. 4, tin debris or tin vapor caused by laser irradiation to the tin target droplet DP is collected by the heated tin vane bucket 350. Then, the collected tin (molten tin) is directed to a tin store bucket (reservoir) 450 via a first conduit 610, on which a first valve 510 is disposed. Recycled tin stored in the tin store bucket 450, which is heated at a temperature higher than the melting point of tin, e.g., about 250° C. to about 300° C., is supplied to a target droplet generator 115 via a second conduit 620, on which a second valve 520 is disposed. Further, a pressurizing device 440 is coupled to the tin store bucket 450 via a third conduit 630, on which a third valve 530 is disposed. In some embodiments, the pressurizing device 440 includes a compressor, a pump, or any other device that can increase a gas pressure. In some embodiments, a facility gas supply (e.g., $N_2$) or a pressurized gas tank through a regulator is used.

In some embodiments, at least the first conduit 610 and the second conduit 620 and the first valve 510 and the second valve 520 are heated at a temperature higher than the melting point of tin, e.g., about 250° C. to about 300° C. A controller 500 controls operations of the pressurizing device 440 and the first to third valves. In some embodiments, the controller 500 includes a processor and a memory storing a control program and when the control program is executed by the processor, the control program causes the processor to perform intended operations. In other embodiments, the controller 500 is constituted by an electronic circuit, such as a semiconductor microcomputer.

As shown in FIG. 4, a first tin purification device 400 is provided on the first conduit 610. In some embodiments, the first tin purification device 400 includes a filter to purify the recycled tin before refilling back to the tin droplet generator 115. In some embodiments, the filter includes a porous membrane to filter particles having a size greater than about 1.0 µm to about 2.0 µm (e.g., about 1.5 µm). In certain embodiments, the filter has a pore size (diameter) in a range from about 1.0 µm to about 2.0 µm. In certain embodiments, the filter is a ceramic filter, such as a ceramic honeycomb filter and a ceramic foam filter. In some embodiments, the filter can remove particles having diameter larger than 1.0 µm, such as about 100 µm.

In a normal condition of the EUV radiation source, molten tin is stored in the target droplet generator 115, and tin droplets are generated by the target droplet generator 115. The tin droplet are irradiated by the laser LR2 in front of the collector 110, thereby generating EUV light. The tin debris and/or tin vapor are collected by the debris collection mechanism including vanes, and the molten tin collected by the vanes is directed to the heated tin vane bucket 350.

In the normal condition, the first valve 510 is opened to collect the recycled tin into the tin store bucket 450, while the second valve 520 and the third valve 530 are closed. When the target droplet generator 115 runs out of tin or the stored tin in the target droplet generator 115 is less than a threshold amount, the third valve 530 and the second valve 520 are opened, and the pressurizing device is operated to provide a pressurizing gas to the tin store bucket 450, thereby molten tin is supplied to fill the tin droplet generator 115. The pressuring gas is one or more of $H_2$, He, Ar, $N_2$ or another inert gas in some embodiments. In the configuration of FIG. 4, the tin collected by the droplet catcher 120 is not reused. In some embodiments, the amount of tin in the target droplet generator 115 is monitored by the controller 500.

Figure 5:
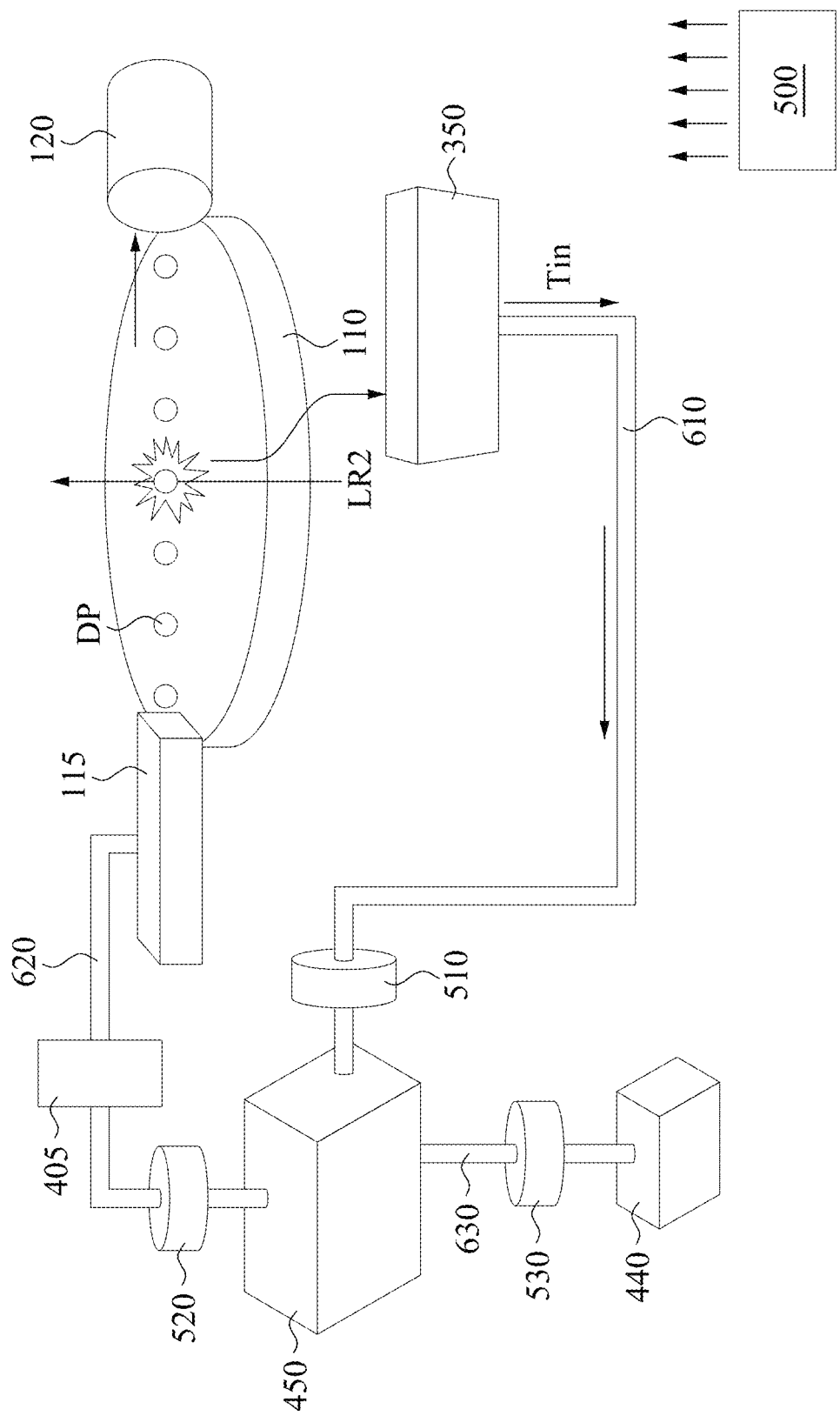
FIG. 5 shows a configuration of a tin reuse system for an EUV radiation source according to an embodiment of the present disclosure.

FIG. 5 shows a configuration of a tin reuse system for an EUV radiation source according to an embodiment of the present disclosure. Materials, configurations, devices, parts and/or processes described with respect to FIG. 4 may be employed in the following embodiments and the detailed explanation thereon may be omitted. In this embodiment, collected tin by the heated tin vane bucket 350 is reused.

In the configuration of FIG. 5, a second tin purification device 405 is disposed on the second conduit 620, and no tin purification device is disposed on the first conduit 610. Other configurations are substantially the same as those shown in FIG. 4.

Figure 6:
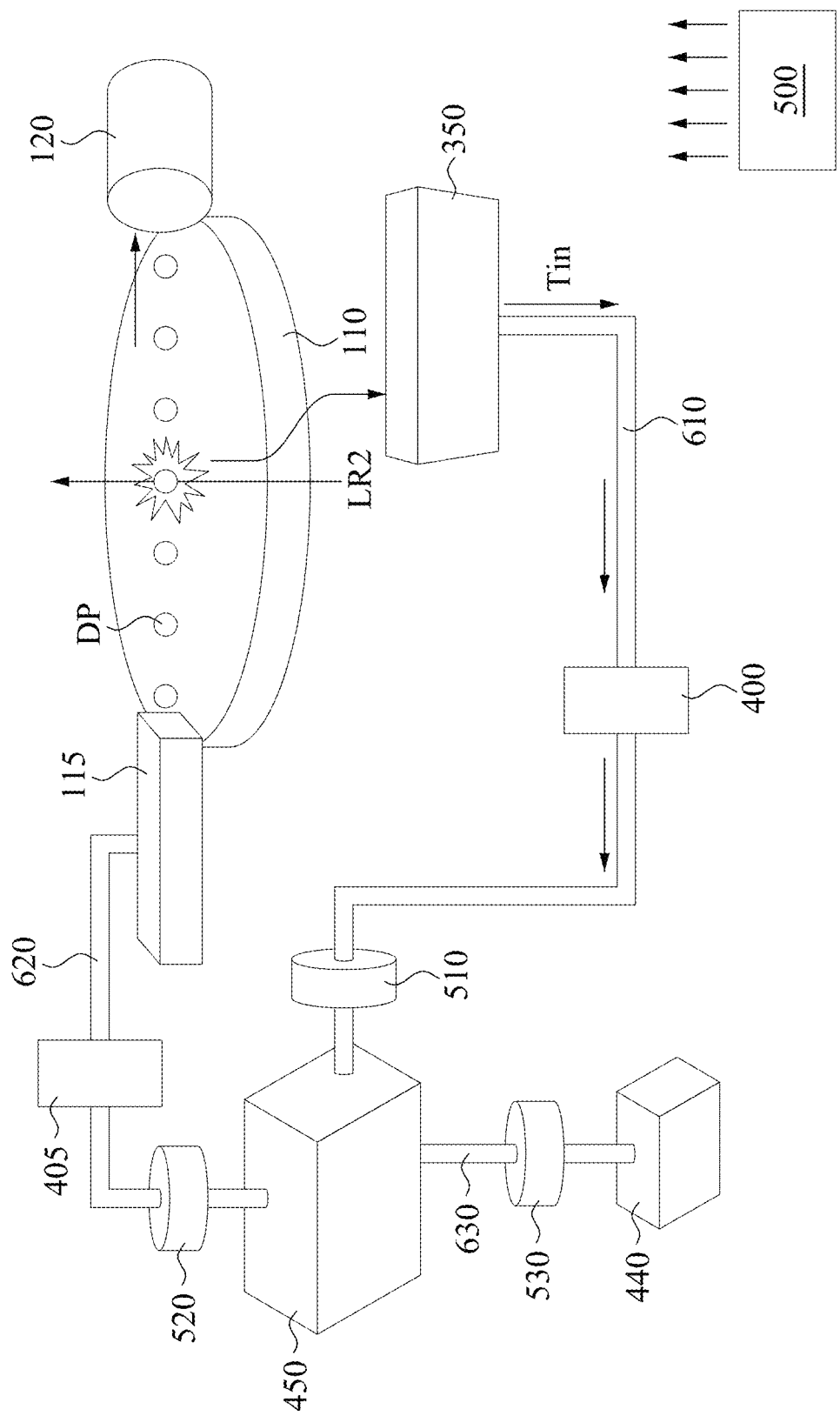
FIG. 6 shows a configuration of a tin reuse system for an EUV radiation source according to an embodiment of the present disclosure.

FIG. 6 shows a configuration of a tin reuse system for an EUV radiation source according to an embodiment of the present disclosure. Materials, configurations, devices, parts and/or processes described with respect to FIGS. 4 and 5 may be employed in the following embodiments and the detailed explanation thereon may be omitted. In this embodiment, collected tin by the heated tin vane bucket 350 is reused.

In the configuration of FIG. 6, a first tin purification device 400 is disposed on the first conduit 610 and a second tin purification device 405 is also disposed on the second conduit 620. Other configurations are substantially the same as those shown in FIGS. 4 and 5. In some embodiments, the second tin purification device 405 can remove smaller particles or contaminations than the first tin purification device 400.

Figure 7:
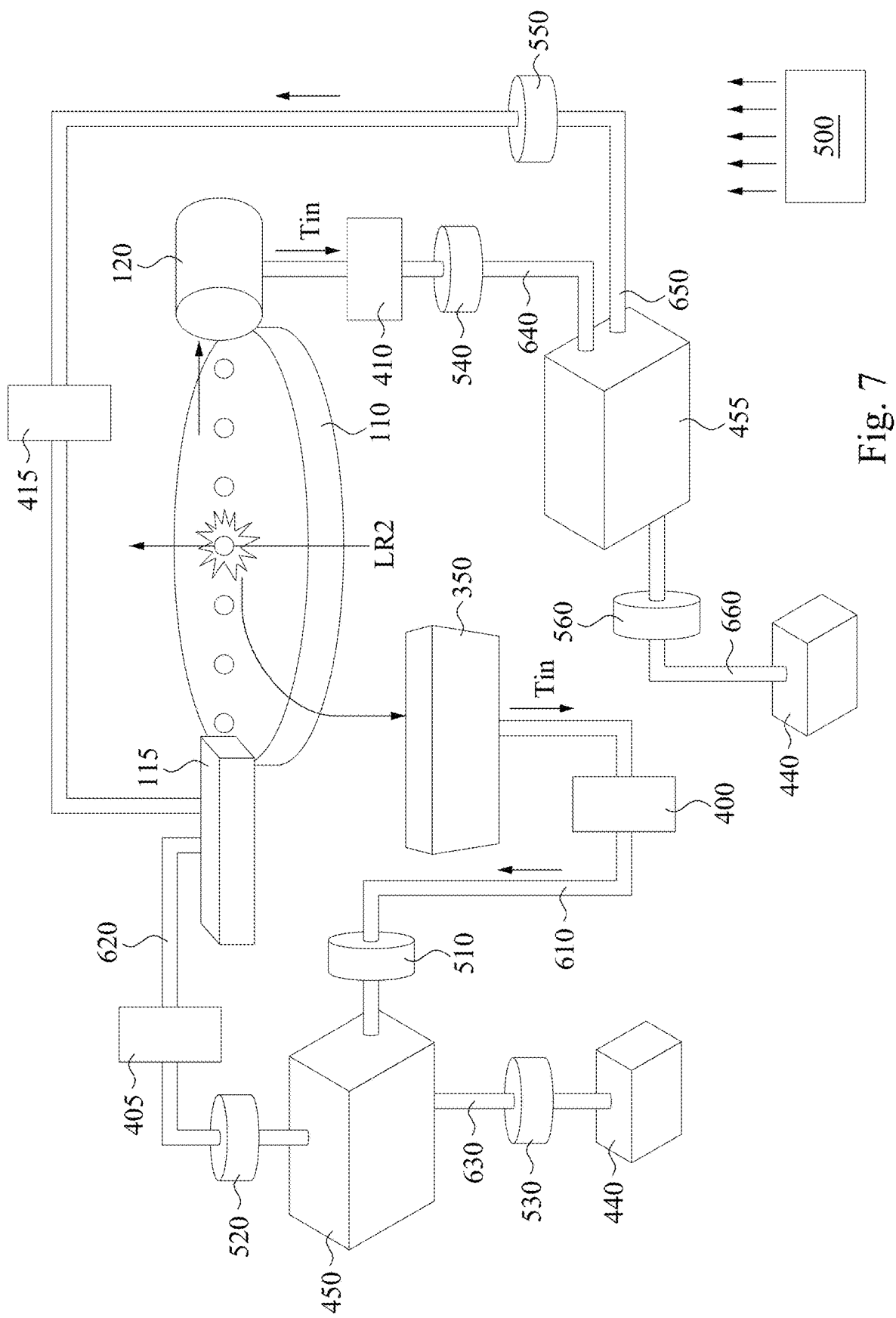
FIG. 7 shows a configuration of a tin reuse system for an EUV radiation source according to an embodiment of the present disclosure.

FIG. 7 shows a configuration of a tin reuse system for an EUV radiation source according to an embodiment of the present disclosure. Materials, configurations, devices, parts and/or processes described with respect to FIGS. 4-6 may be employed in the following embodiments and the detailed explanation thereon may be omitted. In this embodiment, collected tin by the heated tin vane bucket 350 and the tin droplet catcher 120 is reused.

The tin reuse configuration and operations for recycling the collected tin by the heated tin vane bucket 350 is substantially the same as those shown in FIGS. 4-6. At least one of the first tin purification device 400 and the second tin purification device 405 is utilized.

The tin reuse configuration and operations for recycling the collected tin by the tin droplet catcher 120 are substantially the same as or similar to those of tin reuse configuration for recycling the collected tin by the heated tin vane bucket 350.

As shown in FIG. 7, unused tin droplets DP are collected by the tin droplet catcher 120. Then, the collected tin (molten tin) is directed to a second tin store bucket (reservoir) 455 via a fourth conduit 640, on which a fourth valve 540 is disposed. Recycled tin stored in the second tin store bucket 455, which is heated at a temperature higher than the melting point of tin, e.g., about 250° C. to about 300° C., is supplied to the target droplet generator 115 via a fifth conduit 650, on which a fifth valve 550 is disposed. Further, a second pressurizing device 445 is coupled to the second tin store bucket 455 via a sixth conduit 660, on which a sixth valve 560 is disposed. In some embodiments, at least the fourth conduit 640 and the fifth conduit 650 and the fourth valve 540 and the fifth valve 550 are heated at a temperature higher than the melting point of tin, e.g., about 250° C. to about 300° C. A controller 500 controls operations of the pressurizing devices 440 and 445 and the first to sixth valves.

A third tin purification device 410 is disposed on the fourth conduit 640 and/or a fourth tin purification device 415 is disposed on the fifth conduit 650. At least one of the third tin purification device 410 and the fourth tin purification device 415 is utilized. In some embodiments, the fourth tin purification device 415 can remove smaller particles or contamination than the third tin purification device 410.

In some embodiments, filtration ability (percentage of particle catching rate and/or filterable size) of the third tin purification device 410 and the fourth tin purification device 415 is lower than that of the first tin purification device 400 and the second tin purification device 405, because the collected tin by the tin droplet catcher is cleaner than the collected tin by the heated tin vane bucket.

In some embodiments, the second conduit 620 and the fifth conduit 650 are merged at a location before the tin droplet generator 115.

In the normal condition of the EUV radiation source, molten tin is stored in the target droplet generator 115, and tin droplets are generated by the target droplet generator 115. The tin droplets are irradiated by the laser LR2 in front of the collector 110, thereby generating EUV light. Some of the tin droplets are missed and are caught by the tin droplet catcher 120. In the normal condition, the fourth valve 540 is opened to collect the recycled tin into the second tin store bucket 455, while the fifth valve 550 and the sixth valve 560 are closed. When the target droplet generator 115 runs out of tin, the sixth valve 560 and the fifth valve 550 are opened, and the second pressurizing device 445 is operated to provide a pressurizing gas to the second tin store bucket 455, thereby molten tin is supplied to fill the tin droplet generator 115. The pressuring gas is one or more of $H_2$, He, Ar, $N_2$ or another inert gas in some embodiments.

In some embodiments, one of the tin reuse systems from the heated tin vane bucket 350 and the tin droplet catcher 120 is selectively used, or both of them are used to supply the recycled tin to the target droplet generator 115.

Figure 8:
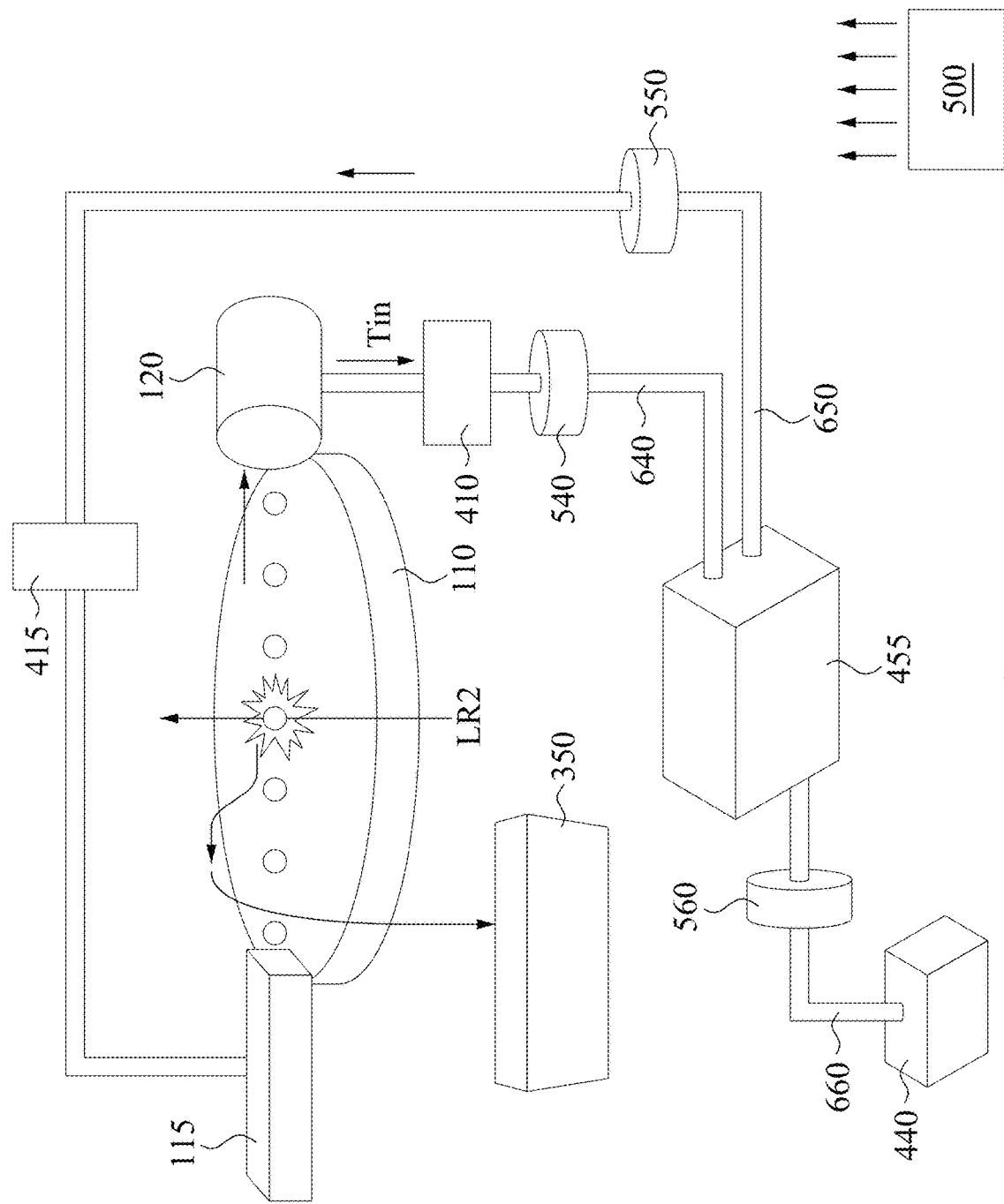
FIG. 8 shows a configuration of a tin reuse system for an EUV radiation source according to an embodiment of the present disclosure.

FIG. 8 shows a configuration of a tin reuse system for an EUV radiation source according to an embodiment of the present disclosure. Materials, configurations, devices, parts and/or processes described with respect to FIGS. 4-7 may be employed in the following embodiments and the detailed explanation thereon may be omitted. In this embodiment, only the collected tin by the tin droplet catcher 120 is reused, and the tin collected by the heated tin vane bucket 350 is not reused.

As shown in FIG. 8, similar to FIG. 7, unused tin droplets DP are collected by the tin droplet catcher 120. Then, the collected tin (molten tin) is directed to a second tin store bucket (reservoir) 455 via a fourth conduit 640, on which a fourth valve 540 is disposed. Recycled tin stored in the second tin store bucket 455 is supplied to the target droplet generator 115 via a fifth conduit 650, on which a fifth valve 550 is disposed. Further, a second pressurizing device 445 is coupled to the second tin store bucket 455 via a sixth conduit 660, on which a sixth valve 560 is disposed. A controller 500 controls operations of the pressurizing devices 440 and 445 and the first to sixth valves.

A third tin purification device 410 is disposed on the fourth conduit 640 and/or a fourth tin purification device 415 is disposed on the fifth conduit 650. At least one of the third tin purification device 410 and the fourth tin purification device 415 is utilized. In some embodiments, the fourth tin purification device 415 can remove smaller particles or contaminations than the third tin purification device 410.

Figure 9:
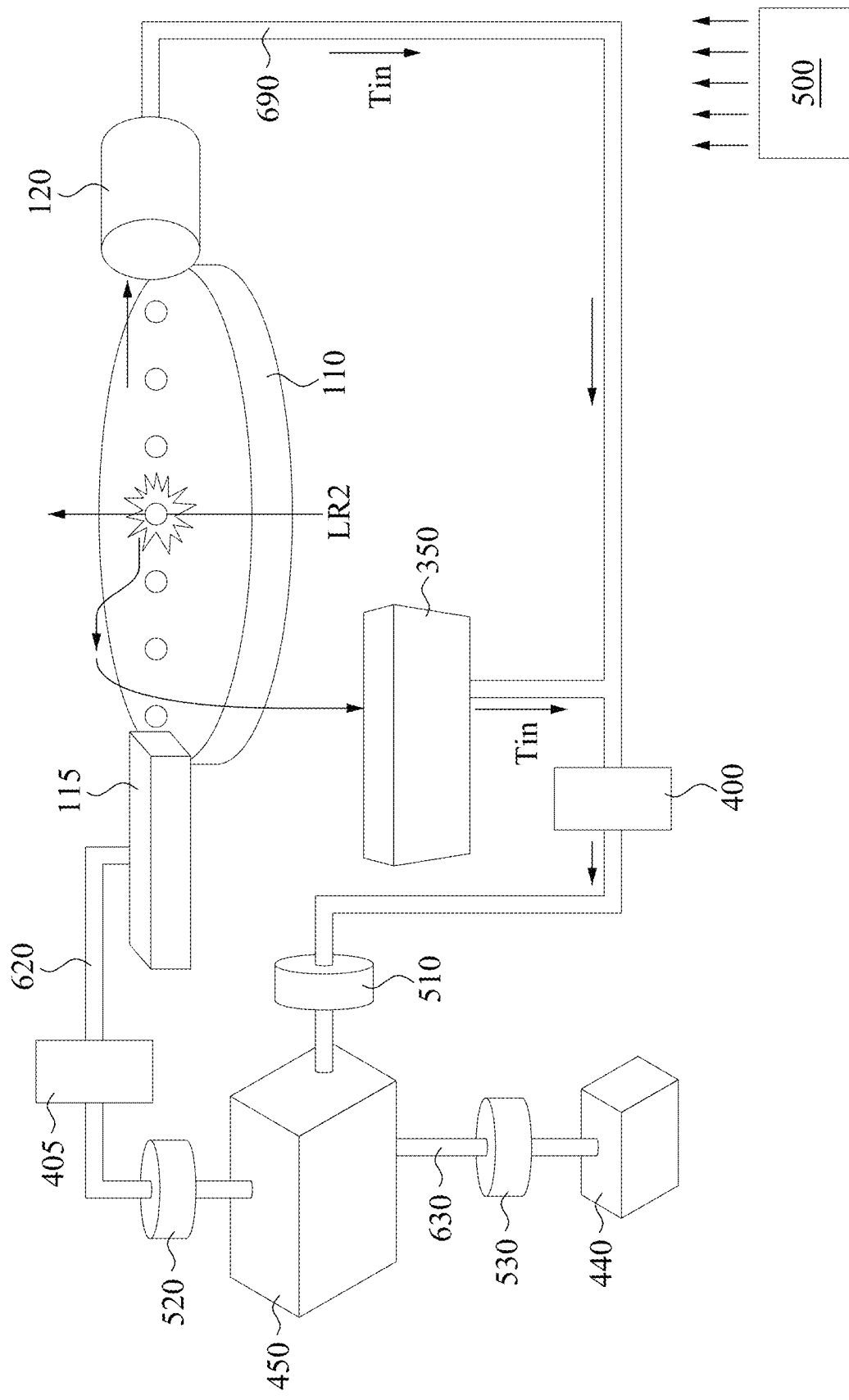
FIG. 9 shows a configuration of a tin reuse system for an EUV radiation source according to an embodiment of the present disclosure.

FIG. 9 shows a configuration of a tin reuse system for an EUV radiation source according to an embodiment of the present disclosure. Materials, configurations, devices, parts and/or processes described with respect to FIGS. 4-8 may be employed in the following embodiments and the detailed explanation thereon may be omitted. In this embodiment, collected tin by the heated tin vane bucket 350 and the tin droplet catcher 120 is reused.

Unlike the configuration of FIG. 7, in the tin reuse system of FIG. 9, the tin store bucket 450 is shared by the recycle path from the heated tin vane bucket 350 and the recycle path from the tin droplet catcher 120.

As shown in FIG. 9, a common tin purification device 420 is disposed on a common conduit 670 located at downstream of the merge point of a conduit 680 from the heated tin vane bucket 350 and a conduit 690 from the tin droplet catcher 120. In some embodiments, only one of the second tin purification device 405 and the common tin purification device 420 is used. In some embodiments, the second tin purification device 405 can remove smaller particles or contaminants than the common tin purification device 420.

Figure 10:
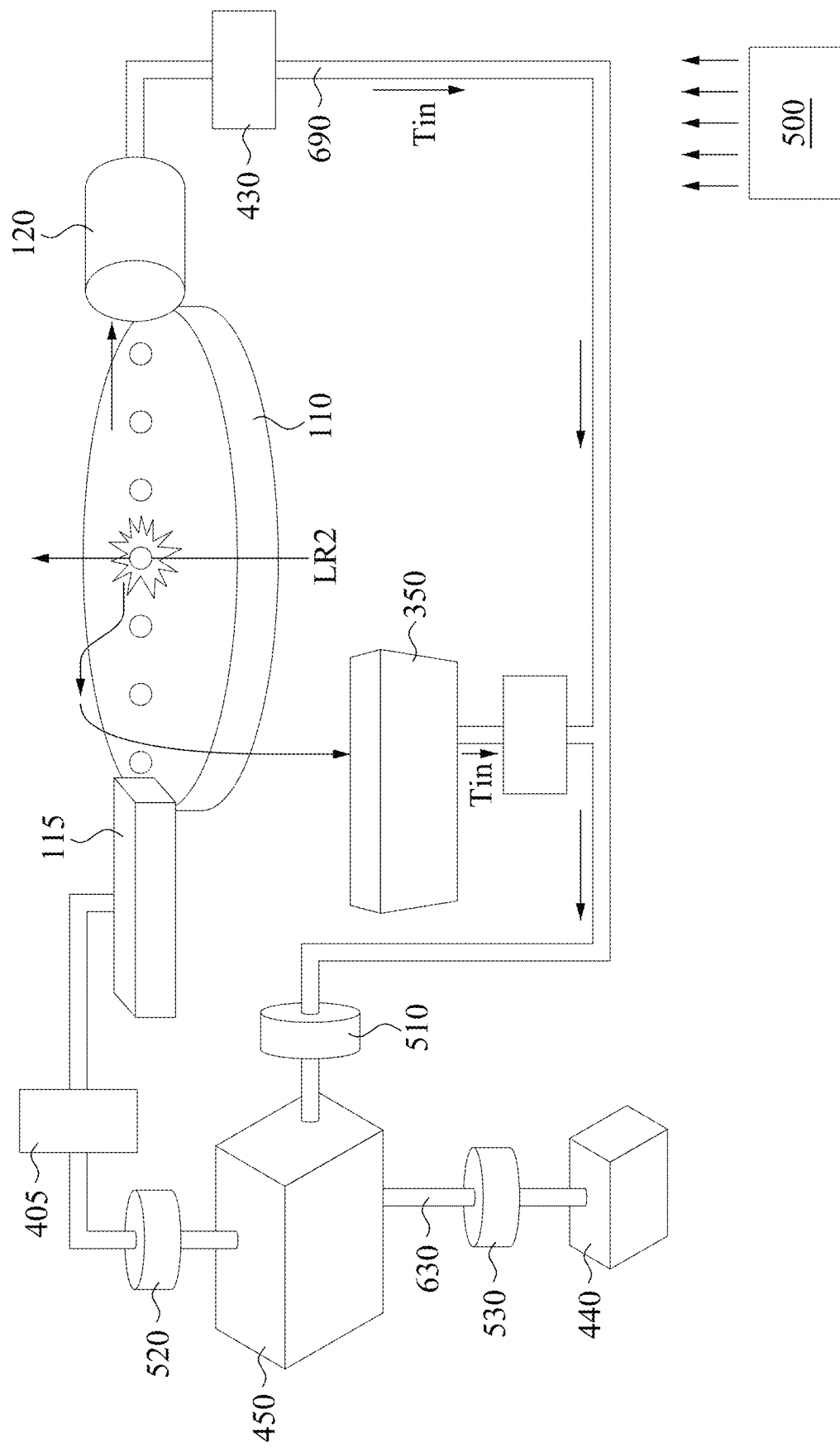
FIG. 10 shows a configuration of a tin reuse system for an EUV radiation source according to an embodiment of the present disclosure.

FIG. 10 shows a configuration of a tin reuse system for an EUV radiation source according to an embodiment of the present disclosure. Materials, configurations, devices, parts and/or processes described with respect to FIGS. 4-8 may be employed in the following embodiments and the detailed explanation thereon may be omitted. In this embodiment, collected tin by the heated tin vane bucket 350 and the tin droplet catcher 120 is reused.

Unlike the configuration of FIG. 9, individual tin purification devices 425 and 430 are disposed on the conduit 680 from the heated tin vane bucket 350 and the conduit 690 from the tin droplet catcher 120, respectively. In some embodiments, the second tin purification device 405 can remove smaller particles or contaminations than the tin purification devices 425 and 430. In certain embodiments, the second tin purification device 405 is not used. In some embodiments, filtration ability (percentage of particle catching rate and/or filterable size) of the tin purification device 430 is lower than that of the tin purification device 425.

It will be understood that not all advantages have been necessarily discussed herein, no particular advantage is required for all embodiments or examples, and other embodiments or examples may offer different advantages.

In the present disclosure, tin used for generating EUV light by laser produced plasma is collected and reused as set forth above. Accordingly, a frequency to refill the tin droplet generator with tin can be reduced, and thus downtime of the EUV radiation source can be decreased. Further, by using one or more tin purification devices, a failure of a tin droplet generator by, for example, clogging, can be prevented.

According to one aspect of the present disclosure, a metal reuse system for an extreme ultra violet (EUV) radiation source apparatus includes a first metal collector for collecting metal from vanes of the EUV radiation source apparatus, a first metal storage coupled to the first metal collector via a first conduit, a metal droplet generator coupled to the first metal storage via a second conduit, and a first metal filtration device disposed on either one of the first conduit and the second conduit. In one or more of the foregoing and the following embodiments, the metal is tin or tin doped with one of Ga and In. In one or more of the foregoing and the following embodiments, the first metal collector is a heated tin vane bucket. In one or more of the foregoing and the following embodiments, the first metal filtration device is disposed on the first conduit. In one or more of the foregoing and the following embodiments, the first metal filtration device is disposed on the second conduit. In one or more of the foregoing and the following embodiments, the metal reuse system further includes a second metal filtration device, and the first metal filtration device is disposed on the first conduit and the second metal filtration device is disposed on the second conduit. In one or more of the foregoing and the following embodiments, the metal reuse system further includes a first pressurizing device coupled to the first metal storage via a third conduit, a first valve disposed on the first conduit, a second valve disposed on the second conduit, a third valve disposed on the third conduit, and a controller that controls the first pressurizing device, the first valve, the second valve and the third valve. In one or more of the foregoing and the following embodiments, the controller is configured to close the second and third valves and open the first valve when an amount of metal in the metal droplet generator is more than a threshold amount, and supply metal stored in the first metal storage by operating the first pressurizing device and opening the second valve and the third valve and closing the first valve, when the amount of metal in the metal droplet generator becomes equal to or less than the threshold amount. In one or more of the foregoing and the following embodiments, the first to third conduits are heated at a temperature higher than a melting point of the metal. In one or more of the foregoing and the following embodiments, the metal reuse system further includes a second metal collector for collecting metal droplets generated from the metal droplet generator, which are not irradiated by laser, a second metal storage coupled to the second metal collector via a fourth conduit, a fifth conduit connecting the metal droplet generator and the second metal storage, and a second metal filtration device disposed on either one of the fourth conduit and the fifth conduit. In one or more of the foregoing and the following embodiments, the metal reuse system further includes a second pressurizing device coupled to the second metal storage via a sixth conduit, a fourth valve disposed on the fourth conduit, a fifth valve disposed on the fifth conduit, and a sixth valve disposed on the sixth conduit. The controller is configured to control the second pressurizing device, the fourth valve, the fifth valve and the sixth valve.

In accordance with another embodiment of the present disclosure, a metal reuse system for an extreme ultra violet (EUV) radiation source apparatus includes a first metal collector for collecting metal from vanes of the EUV radiation source apparatus, a second metal collector for collecting metal droplets generated from a metal droplet generator, which are not irradiated by laser, a first conduit extending from the first metal collector, a second conduit extending from the second metal collector, a third conduit coupled to the first conduit and the second conduit, a metal storage coupled to the third conduit and coupled to the metal droplet generator via a fourth conduit, and at least one metal filtration device disposed on one of the first, second, third and fourth conduits. In one or more of the foregoing and the following embodiments, the metal is tin or tin doped with one of Ga and In. In one or more of the foregoing and the following embodiments, the first metal collector is a heated tin vane bucket and the second metal collector is a tin droplet collector. In one or more of the foregoing and the following embodiments, a first metal filtration device is disposed on the fourth conduit. In one or more of the foregoing and the following embodiments, a second metal filtration device is disposed on the third conduit. In one or more of the foregoing and the following embodiments, a third metal filtration device is disposed on the first conduit and a fourth metal filtration device is disposed on the second conduit. In one or more of the foregoing and the following embodiments, the metal reuse system further includes a pressurizing device coupled to the metal storage via a fifth conduit, a first valve disposed on the third conduit, a second valve disposed on the fourth conduit, a third valve disposed on the fifth conduit, and a controller that controls the pressurizing device, the first valve, the second valve and the third valve. In one or more of the foregoing and the following embodiments, the controller is configured to close the second and third valves and open the first valve when an amount of metal in the metal droplet generator is more than a threshold amount, and supply metal stored in the metal storage by operating the pressurizing device and opening the second valve and the third valve and closing the first valve, when the amount of metal in the metal droplet generator becomes equal to or less than the threshold amount.

In accordance with another aspect of the present disclosure, an extreme ultra violet (EUV) radiation source apparatus includes a collector, a target droplet generator for generating a metal (Sn) droplet, a rotatable debris collection device including vanes, a first metal reuse system, and a chamber enclosing at least the collector and the rotatable debris collection device. The first metal reuse system includes a first metal collector for collecting metal from vanes of the EUV radiation source, a first metal storage coupled to the first metal collector via a first conduit, a second conduit connected to the metal droplet generator and the first metal storage, and a first metal filtration device disposed on either one of the first conduit and the second conduit. In one or more of the foregoing and the following embodiments, the first metal reuse system further includes a second metal filtration device, and the first metal filtration device is disposed on the first conduit and the second metal filtration device is disposed on the second conduit. In one or more of the foregoing and the following embodiments, the first metal reuse system further includes a first pressurizing device coupled to the first metal storage via a third conduit, a first valve disposed on the first conduit, a second valve disposed on the second conduit, a third valve disposed on the third conduit, and a controller that controls the first pressurizing device, the first valve, the second valve and the third valve. In one or more of the foregoing and the following embodiments, the controller is configured to close the second and third valves and open the first valve when an amount of metal in the metal droplet generator is more than a threshold amount, and supply metal stored in the first metal storage by operating the first pressurizing device and opening the second valve and the third valve and closing the first valve, when the amount of metal in the metal droplet generator becomes equal to or less than the threshold amount. In one or more of the foregoing and the following embodiments, the EUV radiation source further includes a second metal reuse system including a second metal collector for collecting metal droplets generated from the metal droplet generator, which are not irradiated by laser, and one or more conduits coupled between the second metal collector and the metal droplet generator.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of operating an extreme ultra violet (EUV) radiation source apparatus, comprising:
    generating metal droplets by a droplet generator;
    irradiating the metal droplets with an excitation laser;
    collecting metal debris from an inside a chamber of the EUV radiation source apparatus;
    storing in a storage the collected metal debris;
    supplying the metal debris from the storage to the droplet generator; and
    filtering by a filter the metal debris before transferring the metal debris to the droplet generator.

2. The method of claim 1, wherein the metal debris is filtered before the metal debris is stored.

3. The method of claim 1, wherein the metal debris is filtered after the metal debris exits from the storage.

4. The method of claim 1, further comprising heating the storage.

5. The method of claim 1, further comprising pressurizing the storage.

6. The method of claim 1, wherein the filter includes a porous membrane to filter particles having a size greater than 1.0 µm.

7. The method of claim 1, wherein the filter includes a ceramic filter.

8. A method of operating an extreme ultra violet (EUV) radiation source apparatus, wherein the EUV radiation source apparatus comprises:
    a droplet generator for generating metal droplets;
    a first metal collector for collecting metal debris from an inside a chamber of the EUV radiation source apparatus;
    a first metal storage coupled to the first metal collector via a first conduit;

a second conduit coupled to the first metal storage;
a first metal filtration device disposed in either one of the first conduit or the second conduit;
a first pressurizing device coupled to the first metal storage via a third conduit;
a first valve disposed on the first conduit;
a second valve disposed on the second conduit;
a third valve disposed on the third conduit; and
a controller that controls the first pressurizing device, the first valve, the second valve, and the third valve,
the method comprising:
collecting the metal debris from the inside of the chamber of the EUV radiation source apparatus;
storing in the first metal storage the collected metal debris;
closing the second and third valves and opening the first valve when an amount of metal in the droplet generator is more than a threshold amount, and
supplying the metal debris stored in the first metal storage by operating the first pressurizing device and opening the second valve and the third valve and closing the first valve, when the amount of the metal in the droplet generator becomes equal to or less than the threshold amount.

9. The method of claim 8, further comprising heating the first to third conduits at a temperature higher than a melting point of the metal.

10. The method of claim 8, further comprising filtering by a filter the metal debris before transferring the metal debris to the droplet generator.

11. The method of claim 10, wherein the filter is disposed on the first conduit.

12. The method of claim 10, wherein the filter is disposed on the second conduit.

13. The method of claim 10, wherein the filter is disposed on each of the first conduit and the second conduit.

14. The method of claim 10, wherein the filter includes a porous membrane to filter particles having a size greater than 1.0 μm.

15. The method of claim 10, wherein the filter includes a ceramic filter.

16. A method of operating an extreme ultra violet (EUV) radiation source apparatus, wherein the EUV radiation source apparatus comprises:
a metal collector for collecting metal from an inside a chamber of the EUV radiation source apparatus;
a metal storage coupled to the metal collector via a first conduit;
a second conduit coupled to the metal storage; and
a metal filtration device disposed either one of the first conduit or the second conduit,
the method comprising reusing the metal collected by the metal collector in a droplet generator after the metal is filtered by the metal filtration device.

17. The method of claim 16, wherein the metal collector is a heated tin vane bucket.

18. The method of claim 16, wherein the metal collector is a droplet catcher of the EUV radiation source.

19. The method of claim 16, wherein the metal filtration device is disposed on each of the first conduit and the second conduit.

20. The method of claim 16, wherein the metal filtration device includes a porous membrane to filter particles having a size greater than 1.0 μm.

* * * * *